United States Patent

Sudo et al.

[11] Patent Number: 6,042,770
[45] Date of Patent: Mar. 28, 2000

[54] PROCESS FOR THE PRODUCTION OF PLASTIC CAP

[75] Inventors: Morihiro Sudo, Sumida-ku; Hiroshi Togashi, Abiko, both of Japan

[73] Assignee: Daikyo Seiko Ltd., Tokyo, Japan

[21] Appl. No.: 09/124,056

[22] Filed: Jul. 29, 1998

Related U.S. Application Data

[62] Division of application No. 08/733,318, Oct. 17, 1996, Pat. No. 5,823,373.

[30] Foreign Application Priority Data

Oct. 18, 1995 [JP] Japan .................................. 7-270201
Mar. 5, 1996 [JP] Japan .................................... 8-47505

[51] Int. Cl.⁷ ........................... B29C 45/27; B29C 45/44
[52] U.S. Cl. ....................... 264/248; 264/255; 264/318; 264/328.1
[58] Field of Search .................... 264/245, 248, 264/255, 268, 271.1, 279, 318, 328.1; 215/247, 249, 251

[56] References Cited

U.S. PATENT DOCUMENTS

| | | |
|---|---|---|
| 3,358,865 | 12/1967 | Andersen . |
| 3,379,326 | 4/1968 | Andersen . |
| 3,888,377 | 6/1975 | Stadler . |
| 4,157,883 | 6/1979 | Mares ...................................... 264/255 |
| 4,180,173 | 12/1979 | Diaz . |
| 4,274,543 | 6/1981 | Braymer, Jr. et al. . |
| 4,456,138 | 6/1984 | Bereziat . |
| 4,482,069 | 11/1984 | Stadler . |
| 4,758,392 | 7/1988 | Collins et al. ............................ 264/248 |
| 4,965,035 | 10/1990 | Ishiwatari et al. ....................... 264/255 |
| 5,038,951 | 8/1991 | Rizzardi . |
| 5,059,360 | 10/1991 | Sato ......................................... 264/254 |
| 5,125,921 | 6/1992 | Duschek . |
| 5,152,413 | 10/1992 | Conrad . |
| 5,344,036 | 9/1994 | Stansecu et al. . |
| 5,403,525 | 4/1995 | Helgren et al. . |
| 5,447,674 | 9/1995 | Schellenbach ........................... 264/255 |
| 5,755,360 | 5/1998 | Elliott ...................................... 264/255 |
| 5,830,398 | 11/1998 | Heyn et al. .............................. 264/254 |

FOREIGN PATENT DOCUMENTS

| | | |
|---|---|---|
| 339 336 | 11/1989 | European Pat. Off. . |
| 348 762 | 1/1990 | European Pat. Off. . |
| 388 769 | 9/1990 | European Pat. Off. . |
| 614 820 | 9/1994 | European Pat. Off. . |
| 2 529 531 | 1/1984 | France . |
| 27 16 447 | 10/1978 | Germany . |
| 3439212 | 2/1986 | Germany . |
| 397 457 | 2/1966 | Switzerland . |
| 2 172 239 | 9/1986 | United Kingdom . |

*Primary Examiner*—Jill L. Heitbrink
*Attorney, Agent, or Firm*—Wenderoth, Lind & Ponack, L.L.P.

[57] ABSTRACT

A plastic cap is provided which is capable of assuring a high sealing property and is advantageous for protection of the environment because of being readily subjectable to disposal of waste or burning treatment after using a container. The plastic cap comprises a drum part covering the mouth part of a container and sealing material and a top plate positioned on a top wall of the drum part, in which the drum part has, on the inner wall thereof, a protrusion part or wedge-shaped part to be engaged with an annular protrusion on the outer periphery of the container mouth part. A window part opens at the center part of the top wall of the cap drum port, and the outer edge of the window part and the lower part of the top plate are connected through several bridged parts. The top plate has at least a larger area than the window part and covers the window part and top wall and the bridged parts are broken by adding a force in a predetermined direction to the top plate to separate the top plate when using the medicament.

1 Claim, 9 Drawing Sheets

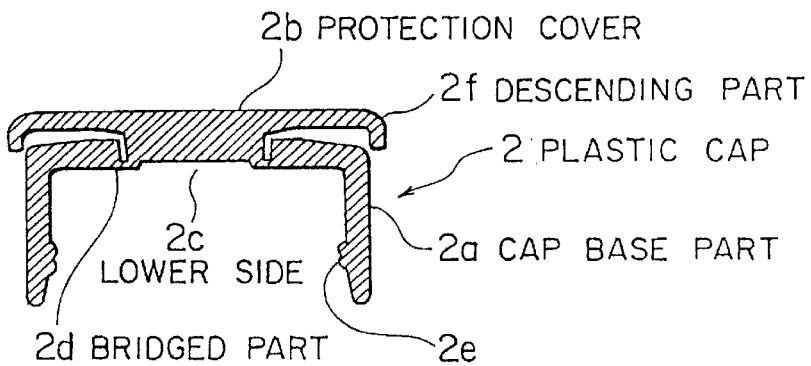
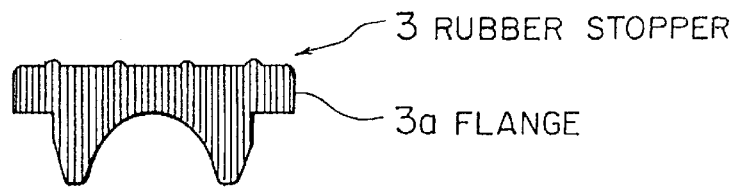
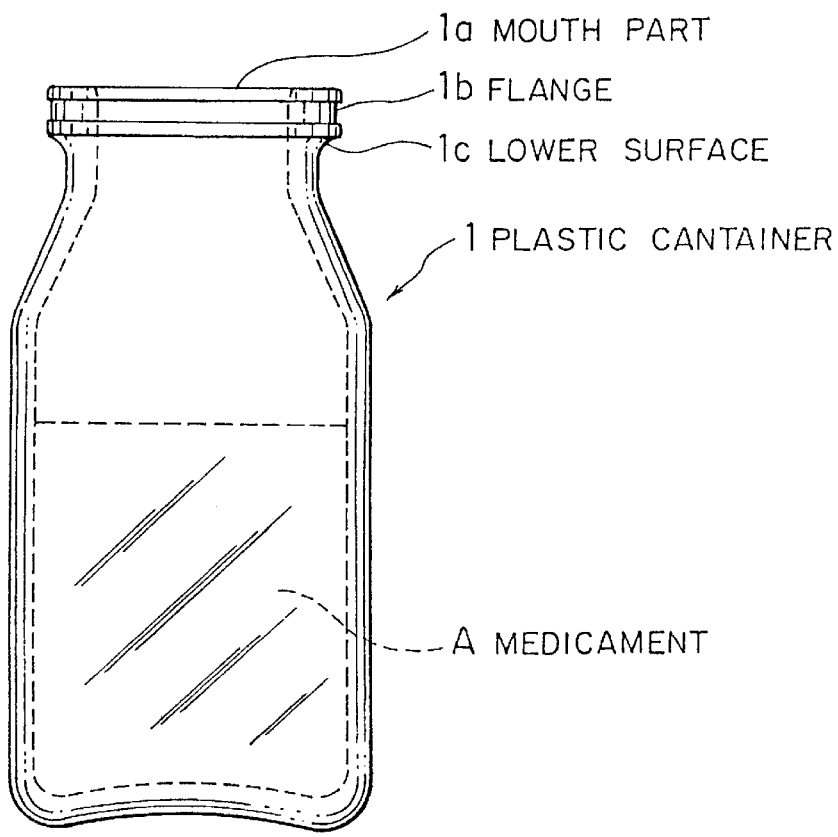

PROCESS FOR THE PRODUCTION OF PLASTIC CAP

This is a Divisional Application of Ser. No. 08/733,318, filed Oct. 17, 1996 now U.S. Pat. No. 5,823,373.

BACKGROUND OF THE INVENTION

1. Field of the Invention

This invention relates to a plastic cap for fixing and holding a stopper such a rubber stopper for sealing containers for medicines and, in particular, a plastic cap which is capable of assuring a high sealing property and is advantageous for the protection of the environment because of being readily subjectable to disposal of waste or incineration treatment after using the container, and a process for the production of the same and a plastic sealed container.

2. Description of the Prior Art

Containers for medicaments, in general, have been used properly as air-tight containers, closed containers and sealed containers, depending on a shape of a medicament. For a container of an injection medicament to be used in the present invention, it is obligated to use a sealed container according to General Rule 34 of the 12th Revision, Japanese Pharmacopoeia. In addition, a container for an injection medicament has such a structure as preventing it from using many times or from altering as a functional feature and in this point, it is different in quality and design from air-tight containers or closed containers for oral medicines or medicines for external application, corresponding to those to be used many times. These differences markedly appear in a sealed part and in the air-tight containers or closed containers, metallic or plastic screwed caps are generally used irrespective of whether the body of the container is of a glass or plastic considering the convenience of using many times.

For example, a container for a medicament having such a structure that a top part of an aluminum cap is separated or broken in the form of a window to expose a top part of a rubber stopper so that an injection needle can be pierced from the top part of the rubber stopper, as the container is sealed by the rubber stopper, has been proposed in Japanese Patent Laid-Open Publication Nos. 1662/1983 and 76871/1992. Furthermore, a technique comprising engaging a bonded part and separable part of a rubber stopper, in combination, and separating the separable part during use to expose the top part of the rubber stopper has been proposed in Utility Model Publication Nos. 20050/1979, 28917/1990 and 26362/1992.

In addition, Utility Model Publication No. 52853/1977 discloses a metallic cap provided with a removable synthetic resin protection cover, to be used in such a manner that a mouth of a container holding a medicament is sealed by a rubber stopper, a metallic cover provided with a window hole at a part corresponding to the central part of the rubber stopper is covered on the rubber stopper and the outside of the container mouth to tightly fix the both, the window hole is covered by the protection cover (top cover) of a synthetic resin, previously inserted in the window hole and the protection cover can readily be separated during use of the medicament.

Still further, a cap for a medicament liquid vial, having an aluminum top cover capable of being broken off by thumb has been proposed in, for example, Japanese Patent Laid-Open Publication Nos. 1662/1983 and 99969/1989, Japanese Patent Publication No. 76871/1992 and Japanese Utility Model Laid-Open Publication No. 89855/1984 and one having a top cover formed of a synthetic resin or flexible material has been proposed in Japanese Patent Laid-Open Publication No. 64961/1981 and Japanese Utility Model Laid-Open Publication No. 180556/1988.

On the other hand, in a container for an injection medicament, the prior art glass containers have been used, but when using the prior art glass containers for various new medicaments having lately been developed, there sometimes arises a problem on the quality stability of the medicaments and various efforts have been made to develop and utilize other materials such as plastics for the purpose of solving this problem. Simultaneously, great interest has been growing concerning another problem of disposal of wastes such as used containers for injection medicaments. That is, in our country and in Europe and America, regulation of the standards thereof has been proceeding as to lightening of containers for medicaments and incineration of containers for medicaments as a countermeasure for protection of the environment from contamination.

In glass containers such as glass vials, such a structure is often used that the container mouth is sealed by a rubber stopper and fastened by an aluminum cap provided with a plastic protecting cover (which will hereinafter be referred to as "aluminum cap") from the outside of the rubber stopper. In view of the whole of such a container as a system, however, separation of the system after being used needs much labor and causes workers to be exposed to danger. That is, in fact, the separation is very difficult and a radical reforming measure has been desired from workers in medical treatments, because materials for a packing container system are four kinds of glass, rubber, metal and plastic, a syringe is of a sealed container and thus has a tenacious structure and a more careful handling is required than ordinary one for treatment of medical wastes.

As described above, it has been required that not only glass containers but also rubber stoppers and aluminum caps for fastening are formed of materials excellent in burning-up property. For example, in Japanese Patent Laid-Open Publication No. 64961/1981, a cap for a glass vial, provided with a plastic protection cover, is proposed so as to simplify a step for formulation of a medicament and aluminum, etc. becomes useless. In view of the whole of such a container as a system, however, three kinds of glass, rubber and plastic are used as raw materials and a treatment after used is still complicated and difficult.

The inventors have already proposed a container for an injection medicament (of two-compartment type), made of a plastic instead of glasses, in Japanese Patent Laid-Open Publication No. 293159/1993. The container of two-compartment type is more excellent in precision of the molding dimension, as compared with glass articles of the prior art.

As described above, caps of the prior art have such a problem that since a cap body part (drum part) to be fixed in the opening part of a conatiner and a protection cover (top part) are made of different materials, separation and abandonment treatment or incineration treatment thereof after administration of a medicament is troublesome, cutting and separation or peeling of the top part and drum part in use is not smoothly effected and the state after the separation or peeling is not good. In the cap of the prior art, furthermore, there is still a problem with respect to stable storage of a medicament held in the container with maintaining the quality well for a long time. The present invention aims at providing a plastic cap with a new structure and a process for the production of the same whereby such problems can be solved. In addition, the present invention aims at lowering the production cost of such a plastic cap.

The inventors have already developed a technique for the production of an incineratable rubber stopper. Based on this technique, the present invention has been made aiming at further improving this technique and achieving a container for an injection medicament of two-compartment type, including a closing cap, with a high producibility in a step for formulation of a medicament, which container has a broad range of properly sterilizing, can readily be used at an actual medical spot and can readily be applied to various treatments after use, for example, treatments for separation, waste treatments, burning-up treatments, etc.

SUMMARY OF THE INVENTION

It is an object of the present invention to provide a plastic cap and a plastic closure structure, and a process for the production of the same, whereby the problems of the prior art are overcome.

It is another object of the present invention to provide a plastic cap capable of assuring a high sealing property and which is advantageous for protection of the environment because of being readily subjectable to disposal of waste or incineration treatment after using the container.

These objects can be achieved by a plastic cap consisting, as a whole, of a hard plastic having a protection cover on the upper surface, for example, a plastic cap composed of a cap base part, a protection cover positioned over the cap base part and a binding part for integrating the cap base part and protection cover.

BRIEF DESCRIPTION OF THE DRAWINGS

The accompanying drawings are to illustrate the principle and merits of the present invention in greater detail.

FIGS. 1(a), (b) and (c) are sectional views of a plastic cap, a rubber stopper and a plastic container, to be combined as one embodiment of the present invention.

DETAILED DESCRIPTION OF THE INVENTION

Figure 2:
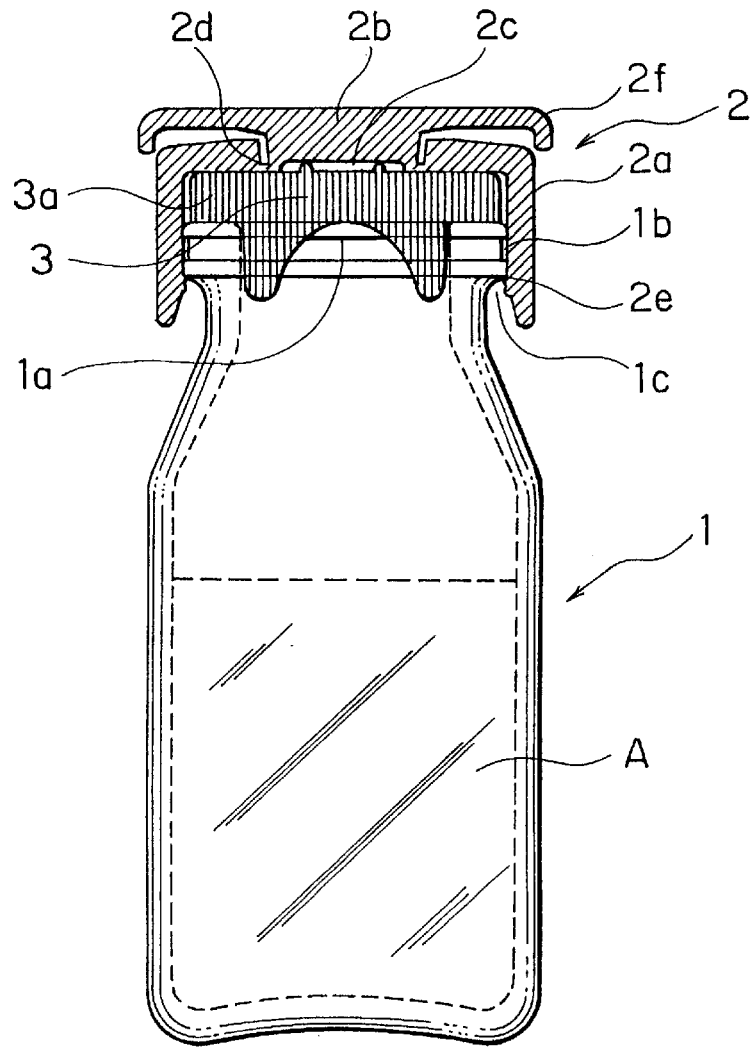
FIG. 2 is a sectional view of an assembly of the parts shown in FIG. 1.

The inventors have made various efforts to solve the above described problems of the prior art and to develop a cap which can be subjected to sterilization in an autoclave with a broad proper range of sterilization, has suitable physical and chemical properties as a sealing container as well as high sanitary properties and can simply be treated after use, aiming at composing a main body of a container and cap of a plastic. In addition to the cap, the inventors have studied a main body of a container as to its material, shape and production process. Accordingly, the inventors have found that the above described object can be achieved by the use of a hard plastic as a material, which has not been used up to the present time, and thus reached the present invention.

Thus, the present invention provides (1) a plastic cap consisting, as a whole, of a hard plastic in the form of having a protection cover on the upper surface, (2) a plastic cap, as described in the above (1), composed of a cap base part, a protection cover positioned over the cap base part and a binding part for integrating the cap base part and protection cover, (3) a plastic cap for covering a container for a medicament and a sealing material for sealing the mouth part of the container to air-tightly fix the container and sealing material, comprising a drum part covering the mouth part of the container and sealing material and a top plate positioned on a top wall of the drum part, in which the drum part has, on the inner wall thereof, a protrusion part or wedge-shaped part to be engaged with an annular protrusion on the outer periphery of the container mouth part and a window part opened at the central part of the top wall, the outer edge of the window part and the lower part of the top plate are connected through several bridged parts, the top plate has at least a larger area than the window part and covers the window part and top wall and the bridged parts are broken by adding a force in a predetermined direction to the top plate to separate the top plate when using the medicament, (4) the plastic cap, as described in the above (3), wherein the plastic cap is made of a thermoplastic resin or composition thereof, (5) the plastic cap, as described in the above (3) or (4), wherein the thermoplastic resin or composition thereof has a load deflection temperature of at least 120° C., (6) the plastic cap, as described in any one of the above (3) to (5), wherein the thermoplastic resin is at least one selected from the group consisting of polyamides, polyethylene terephthalates, polybutylene terephthalates, polypropylene, polymethylpentene, polycarbonates, polyphenylene sulfites, polyarylates, polysulfones, polyether sulfones, polyether ether ketones, polyether imides, liquid crystal polymers, polyether ketones, polyaryl ether ketones, polyacetals, modified polypropylene ethers, aromatic polyamides and cyclic olefin resins, (7) the plastic cap, as described in any one of the above (3) to (6), wherein the number of the bridged parts are two or three and the top plate requires a force of 1 to 20 kgf for stripping and (8) the plastic cap, as described in any one of the above (3) to (7), wherein the top plate has a part of push-off protruded upward and the bridged parts are cut by bringing down the part of push-off Further, the present invention provides (9) a process for the production of a plastic cap comprising (a) a step of forming a plastic into a shape of a cap base part, (b) a step of forming a plastic into a shape of a protection cover positioned at the upper surface of the cap and (c) a step of forming, binding and integrating the plastic cap base part and plastic protection cover respectively formed in the above described (a) and (b), and (10) the process for the production of a plastic cap, as described in the above (9), wherein the above described plastic is a hard plastic.

Further, the present invention provides (11) a process for the production of a plastic cap for covering a container for a medicament and a sealing material for sealing the mouth part of the container to air-tightly fix the container and sealing material, comprising a drum part covering the mouth part of the container and sealing material and a top plate positioned on a top wall of the drum part, in which the drum part has, on the inner wall thereof, a protrusion part or wedge-shaped part to be engaged with an annular protrusion on the outer periphery of the container mouth part and a window part opened at the central part of the top wall, the outer edge of the window part and the lower part of the top plate are connected through several bridged parts, the top plate has at least a larger area than the window part and covers the window part and top wall and the bridged parts are broken by adding a force in a predetermined direction to the top plate to separate the top plate when using the medicament, which process comprises arranging split plate cores for forming respectively a top plate and a cap top on two fixed plate bases on a fixed body, placing a cylindrical mold for molding a cap drum on the split plate core, placing a stripper plate on the upper part of the cylindrical mold for molding a cap drum, fixing the split plate cores and cylindrical mold for molding the cap drum to the lower surface of the stripper plate by combining pins fitted to the fixed plate bases, then arranging two split segments each having dovetail grooves in a cavity formed by the mold for molding a cap drum and split plate cores, thrusting a center movable core whose lower surface part corresponds to a shape of a window part into the split segment by freely adapting to the dovetail grooves provided on the inner side wall of the split segment, fixing the center movable core and split segment to the inner side surface of the stripper plate in such a manner that the split core, mold for molding a cap drum, split segment and center movable core form a cavity corresponding to the shape of the plastic cap and then introducing and injecting a resin or resin composition into the cavity via runners provided in the split segment to effect injection molding of the plastic cap by one stage.

Still further, the present invention provides (12) a plastic sealed container comprising a main body of a plastic container, an incineratable rubber stopper inserted in a mouth part of the main body of the plastic container and a plastic cap for sealing the mouth part of the container, the whole of which consists of a hard plastic and which has a protection cover at the upper surface thereof.

The inventors have made various studies on structures or materials of caps from various standpoints such that they can correspond to various shapes of mouth or opening parts of commercially available containers for medicaments, tightness of a sealing material such as rubber stoppers or rubber plates with a container mouth part is further improved to protect a medicament held in the container from passage of time for a long period of time, e.g. 3 to 5 years, fluctuation of the ambient temperature, influences of transporting or vibrations, etc., and they can be molded in effective manner and in economical manner, and consequently, have found that such a structure produces in very good results that a drum part of a cap and a top part thereof are combined by only small bridged parts and as a material thereof, a synthetic resin having a small thermal change and some rigidity, i.e. a thermoplastic resin is preferable.

Furthermore, the inventors have found that (a) when a container and cap are predominantly formed of a plastic and a stopper (packing) part is formed of an incineratable rubber material, all the materials are incineratable and do not need separation thereof during abandonment, (b) when a hard plastic is used as the plastic material of the cap, the dimensional precision is improved and the sealing property is improved to enlarge an application range of sterilization, while simultaneously, a structure of rendering easy removal of a protection cover during use can be employed, and (c) such a structure can be realized by an economical manner. The present invention is based on this finding.

In addition, the present invention provides a novel method whereby indication of a content in a container can readily be effected by classification by coloring of the protection cover.

By the hard plastic in the present invention is meant a thermoplastic or thermosetting resin having a Rockwell hardness of at least 55 by M Scale or at least 95 by R Scale. As the hard plastic of the present invention, it is more preferable to use those having a Rockwell hardness of at least 55 by M Scale or at least 105 by R Scale.

The reason why the material of the cap of the present invention, as a whole, is specified to the plastic with a higher hardness consists in that the higher the hardness, the higher the thermal deformation temperature (temperature showing a deformation resistance at a constant load). Accordingly, change of the racing torque during passage of time (lowering of the torque due to stress relaxation under loaded state) is decreased. When the hardness is large and the thermal deformation temperature is high even if subjecting to thermal setrilization with a high pressure steam, it is considered as one reason that the degree of sealing property is not changed, that is, there is no occurrence of leakage.

Furthermore, it is desirable to use a hard plastic whose thermal deformation temperature (called also load deflection temperature), when a load of 4.6 kgrf/cm$^2$ (455 kPa, 66 psi) is applied in Load Deflection Temperature Test of Hard Plastic according to JIS K 7217-1983 or in Standard Test Method for Deflection Temperature of Plastics Under Flexural Load according to ASTM D648-82, is higher by at least 3° C. than the sterilization temperature. When a predetermined temperature for an autoclave sterilization is 121° C., for example, the thermal deformation temperature of the hard plastic of a cap is preferably at least 125° C.

As the hard plastic of the present invention, for example, there are used amorphous plastics consisting of copolymers of polycyclic aliphatic hydrocarbons and/or olefinic hydrocarbons, thermoplastic plastics such as propylene homopolymers (abbreviated as PP), polyethylene terephthalates (PETP), polyethylene naphthalates (PEN), polycarbonates (PC), polymethyl methacrylates (PMMA), etc., liquid thermosetting plastics such as of dimethacrylate carbonate types, dicyclopentadiene types, etc., polyacetals (POM) and copolymers, various nylons of non-modified type, ultra-high molecular weight non-modified type polypropylene (UHMWPP), polyphenylene oxides, polyallyl ethers and the like.

In Table 1 are shown sealing properties of various hard plastics used in the present invention in comparison with other materials.

The structure of the plastic cap (which will hereinafter be abbreviated as "cap" sometimes) of the present invention will now be illustrated by the accompanying drawings.

FIGS. 1(a), (b) and (c) are schematic views of parts of a container system before assembling as one embodiment of the present invention and FIG. 2 is a schematic view of an assembled state of a plastic container 1 of FIG. 1, a plastic cap 2 (cap 2) and a rubber stopper 3. In the container 1, A is a medicament filled therein, 1a designates a container mouth part, 1b a mouth part flange and 1c a lower surface of the mouth part flange. The rubber stopper 3 is of a leg-fitted type, having a flange 3a.

The cap 2 of the present invention comprises a cap base part 2a as a main body for covering the rubber stopper 3 and a protection cover 2b provided over the cap base part 2a. The cap base part 2a has a protruded part 2e for engagement with the container mouth part 1a at the lower part of an inner wall of the periphery in contact with the container mouth part 1a. A lower side 2c of the protection cover 2b means an opening part to be an injection needle piercing part when the protection cover 2b is torn off from the cap base part 2a during use.

In the present invention, furthermore, the cap base part 2a and protection cover 2b are combined by a bridged part 2d with a small thickness and width for the purpose of meeting a requirement for improving ease of releasing the cap 2. Thus, the tear-off of the protection cover 2b from the cap is possible by a very small force and the inner surface of the cap base part forms a completely continuous plane capable of functioning to protect and seal the container mouth and rubber stopper.

Figure 3:
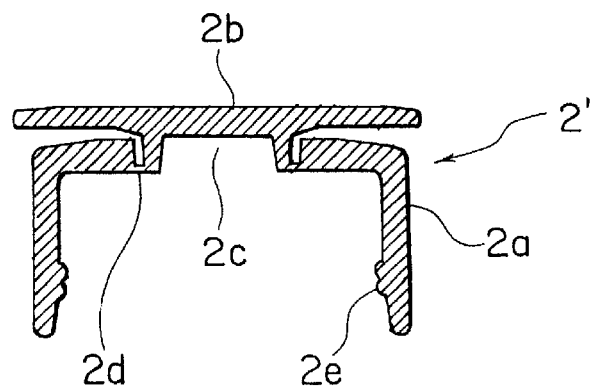
FIG. 3 is a sectional view of another embodiment of the cap of the present invention.
Figure 4:
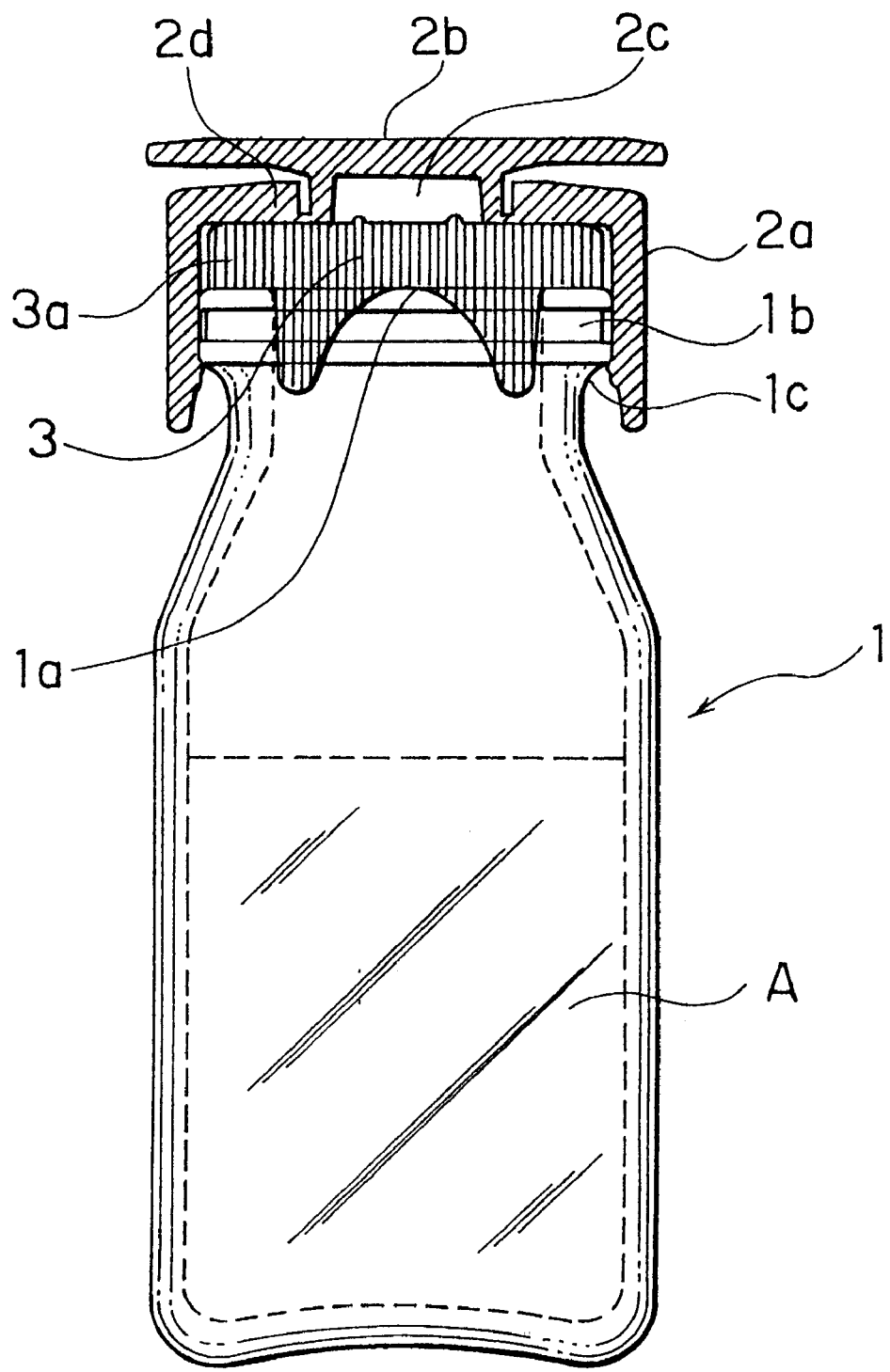
FIG. 4 is a sectional view of an assembly containing the part shown in FIG. 3.

In one embodiment of the present invention, as shown in FIG. 1, the peripheral edge part of the protection cover 2b has a push-off part 2f which has a downwardly curved shape, in cross section, and which will hereinafter be referred to as "edge part for push-off". As another embodiment, a cap 2' has a protection cover 2b which is linear without the edge part for push-off, as shown in FIG. 3. FIG. 4 is a sectional view of an assembly of a container 1, cap 2' from FIG. 3 and rubber stopper 3 in an integrated state. In FIG. 3 and FIG. 4, reference numerals common to those of FIG. 1 and FIG. 2 show like parts.

As to the tearing-off ease of the protection cover 2b, the shape having the edge part for push-off as shown in FIG. 1 is better than the linear shape as shown in FIG. 3, but for molding of the former, a three stage molding method must be applied. The shape of FIG. 3 can be molded by a one or two stage molding method. The plastic cap of the present invention including all parts as described above is characterized by consisting of the hard plastic of the present invention.

A finished article in which a medicament is filled in a container system is as shown in FIG. 2 or FIG. 4. First, the leg part of the rubber stopper 3 is inserted in the plastic container 1 and the upper surface of the container mouth part 1a and the flange 3a of the rubber stopper 3 are closely contacted to seal and hold a medicament A in the plastic container 1. The rubber stopper 3 and the mouth part 1a of the container 1 are covered by the cap 2 and fixed in such a manner that the protruded part 2e on the inner wall of the cap base part 2a is engaged with the lower surface 1c of the mouth part flange of the container 1 to increase the sealing property. When the plastic cap 2 is adapted and fixed, the repulsive and elastic force of the rubber stopper 3, the frictional force due to contact of the lower surface 1c of the mouth part flange and the protruded part 2e and the tensile stress (rigidity) of the plastic cap base part 2a are balanced to produce and hold a compressive force required for closely contacting the rubber stopper.

The protruded part 2e can be formed in such a size that an operation when the cap 2 (or cap 2') is adapted and fixed to the plastic container 1 is not so hindered and a compressive stress sufficient to bring the rubber stopper 3 into close contact with and fixed to the plastic container 1 for a long time can be maintained, and is not limited to the shape as shown in the drawing figures.

Figure 5:
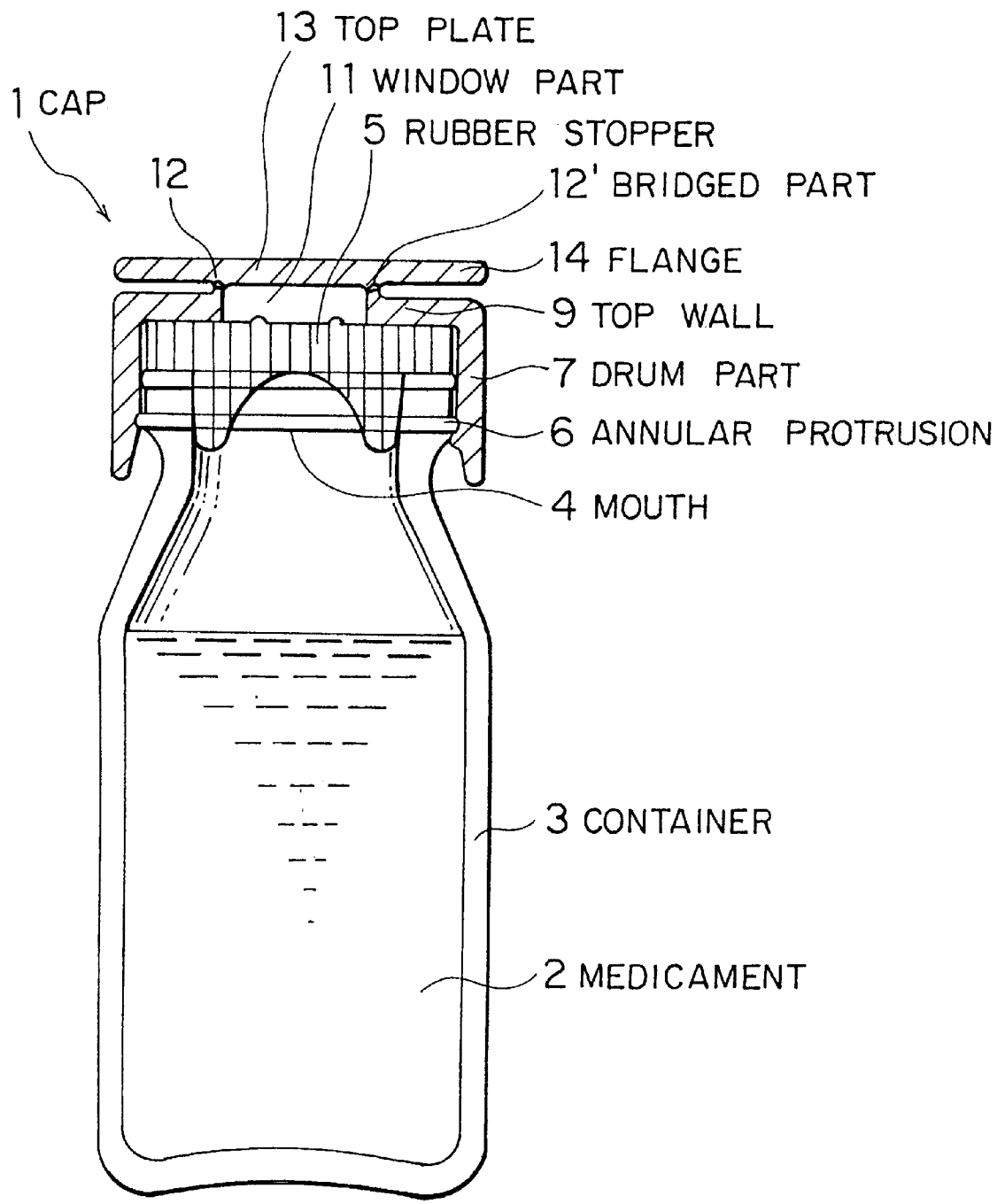
FIG. 5 is a sectional view of a plastic cap, a rubber stopper and a plastic container, combined as one embodiment of the present invention.

According to another embodiment a cap for a medicament container according to the present invention consists in that shown in FIG. 5, wherein an outer periphery of a window part 11, i.e. an opening made in a top wall 9 of a drum part 7, and a top plate 13 are connected by bridged parts 12 and 12' each having a small sectional area. Namely, there are small clearances between the outer periphery of the window part 11 of the top wall 9 and the outer periphery of the top plate 13, which are connected by only the bridged parts 12 and 12' capable of being cut by a small force.

Thus, the cap material and the size and number of the bridged parts are controlled so that the force required for tearing-off the top plate from the drum part at the bridged parts is generally 1 to 20 kgf, preferably 1.5 to 15 kgf, more preferably 2 to 10 kgf.

The top plate can have a structure such as a simple flat plate, dish-shaped plate whose outer edge part descends or a plate provided with a push-off part projected upward so that the top plate can readily be stripped by bringing down the push-off part. The push-off part can be formed into various shapes such as rods, tongues, pallets, etc.

The drum part of the cap of the present invention is made to correspond to the shape of the container mouth part, and the inner wall of the drum part is provided with a protrusive or wedge-shaped projection, in cross section, and tightly contacted and engaged with an annular projection or annular cavity on the periphery of the container.

Examples of the thermoplastic resin used in the present invention include polycarbonates, polyphenylene sulfites, polyarylates, polysulfones, polyether sulfones, polyether ether ketones, polyether imides, liquid crystal polymers, polyether ketones, polyarylether ketones, polyacetals, modified polypropylene ethers, aromatic polyamides and cyclic olefin resins. Examples of the thermoplastic synthetic resin composition used in the present invention include polyamides, polyethylene terephthalates, polybutylene terephthalates, polypropylenes and polymethylpentenes.

A process for the production of a plastic cap according to the present invention will now be illustrated.

Figure 11:
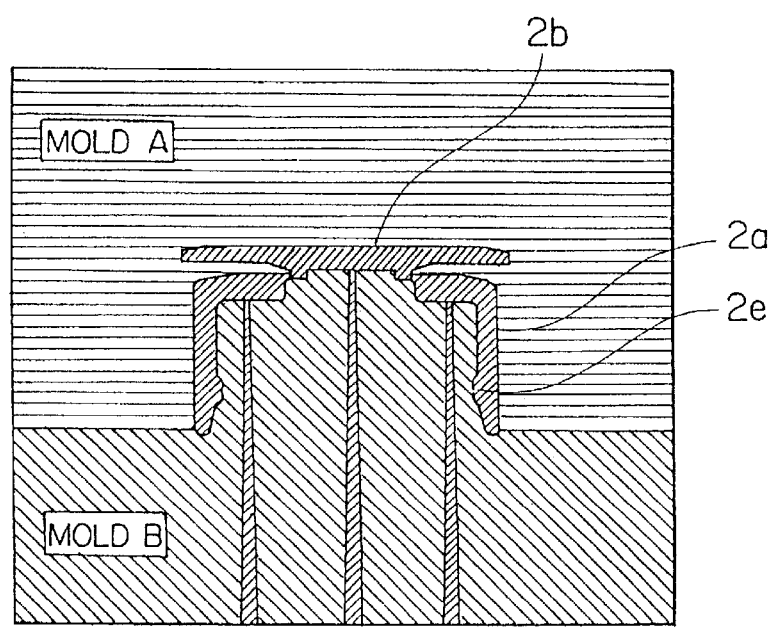
FIG. 11 is a sectional view of illustrating a production process of a cap of the present invention by one stage molding method.

Production of the cap of the present invention, in the case of the shape of the cap 2' in FIG. 3, can be carried out by one stage injection molding method using an upper metallic mold A and a lower metallic mold B, as shown in FIG. 11.

Figure 12:
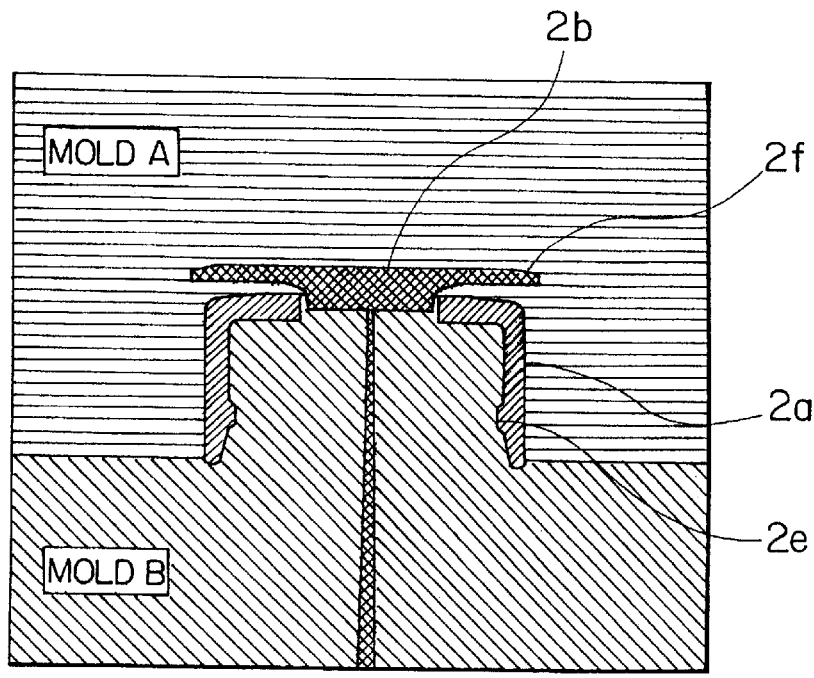
FIG. 12 is a sectional view of illustrating a production process of a cap of the present invention by two stage molding method.

Moreover, a two stage molding method can be employed comprising previously molding the base part 2a of the cap 2' using an upper metallic mold and lower metallic mold, placing the resulting base part 2a in the lower metallic mold as shown in FIG. 12, then arranging the upper metallic mold, forming the protection cover 2b by injection molding and integrating the base part 2a and protection cover 2b to form one body as an article.

When the cap 2' of FIG. 3 is molded by a one or two stage method and taken out of the metallic mold, the protection cover part can be withdrawn, since the metallic mold A is so designed that the metallic mold is split in the right and left directions facing FIG. 11 and FIG. 12. Since the lower metallic mold B cannot be withdrawn downward facing the drawing due to the presence of the protruded part 2e on the inner wall of the cap base part 2a, the outer diameter of a convex part of the metallic mold B (i.e. called "pin") for molding the inside thereof is once narrowed toward a sprue part and then withdrawn downward to demold a molded article from the metallic mold.

The two stage molding method of FIG. 12 has a cycle time of two times as long as the one stage molding method of FIG. 11, but on the other hand, has an advantage that the molding can be effected in such a manner that a plastic material of the protection cover 2b is different from that of the molded base part 2a. For example, such a function can be imparted that judgment of a medicament as a content in a container can readily be effected by the use of a plastic material differing in color for the protection cover part 2.

Production of the cap of the present invention shown in FIG. 1 cannot be carried out by the foregoing one stage method or two stage method. That is, in the case of a shape having the push-off edge part 2f at the outer periphery of the protection cover for the purpose of improving tear-off ease, movement of the metallic mold A in the right and left directions is rendered impossible by the presence of the push-off edge part 2f when using the metallic mold structures as shown in FIG. 11 and FIG. 12 respectively for the one stage method and the two stage method. Up to the present time, the protection cover having an edge part for push-off has generally been molded separately from the cap base part and both are then formed into one body by setting or fusing.

Figure 13:
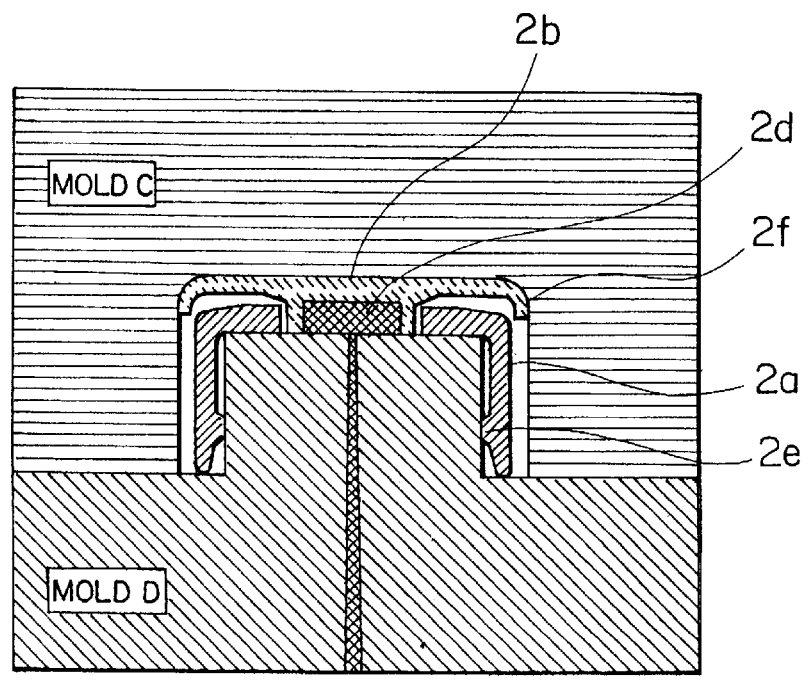
FIG. 13 is a sectional view of illustrating a production process of a cap of the present invention by three stage molding method.

The plastic cap base part 2a and protection cover 2b are previously molded in different metallic molds for private use. Then, the protection cover 2b is arranged at the metallic mold C side and the cap base part 2a is arranged at the metallic mold D side, followed by combining both the molds C and D and closing, as shown in FIG. 13. The same plastic is then injected from a sprue runner part of the metallic mold D side and a part 2d is formed to fuse the parts 2a and 2b and to form one body. After injecting the part 2d to form one body, opening of the mold is carried out by moving the metallic molds C and D respectively in the upper and lower directions facing FIG. 13 and a molded article can be torn off from the mold. This novel three stage method has been developed on the way to research the present invention and the method of the present invention will be referred to as "three stage method". One body formation can be accomplished during molding by the three stage method according to the present invention, resulting in high producibility.

When such a three stage method is employed according to the present invention, color indication of the protection cover of a plastic cap is rendered possible and tearing-off of the protection cover from the cap base part is rendered easy, thus resulting in remarkable improvement of utility of the present system.

The most important functional property as a cap of a plastic container system for injection medicaments consists in maintenance of the sealing property. Firstly, it is required for the cap to have such a heat resistance that change of a rigidity (measured as modulus of elasticity in bending) of the cap base part 2a for a thermal stress, for example, resulting from high pressure steam sterilization during preparation of an injection medicament remains within such a range that a sufficient compressive force of a rubber stopper on the container mouth part is obtained. Secondly, the most important condition in selecting a plastic material to be used for the cap of the present invention is that the dimension of the plastic cap base part is not changed so that the sealing property be maintained over a period of at least three years corresponding to the available period of injection medicaments at normal storage conditions, namely, the stress relaxation for a tensile stress of a plastic (called creep phenomenon of plastic) is present within an allowable limit. In the present invention, this condition can be satisfied by the use of the specified hard plastic as described above.

A compressive force of a rubber stopper to a mouth of a plastic vial, as the most related property with the sealing property, is considered to be proportional to a racing torque of a plastic cap and rubber stopper with the mouth 1a of the plastic vial (revolving torque when the periphery of the cap is held and subjected to racing by a torque meter).

Thus, the racing torques of various plastic caps, during passage of time, were measured in Examples 7 and 8 and Comparative Examples 6 to 8 to obtain results shown in Table 3.

Figure 6B:
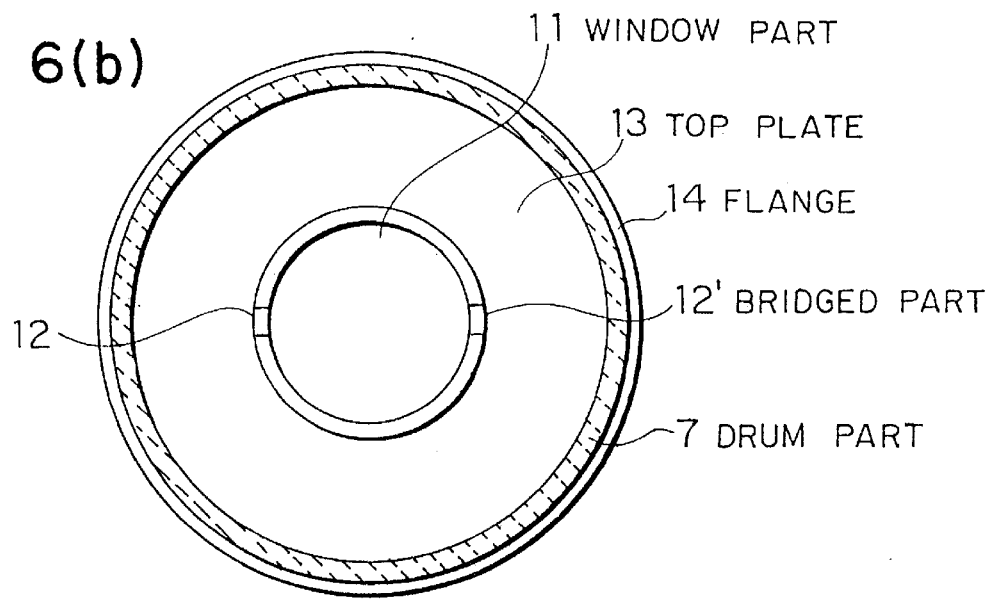
FIGS. 6(a) and (b) are partially sectional views of the cap shown in FIG. 5.
Figure 6A:
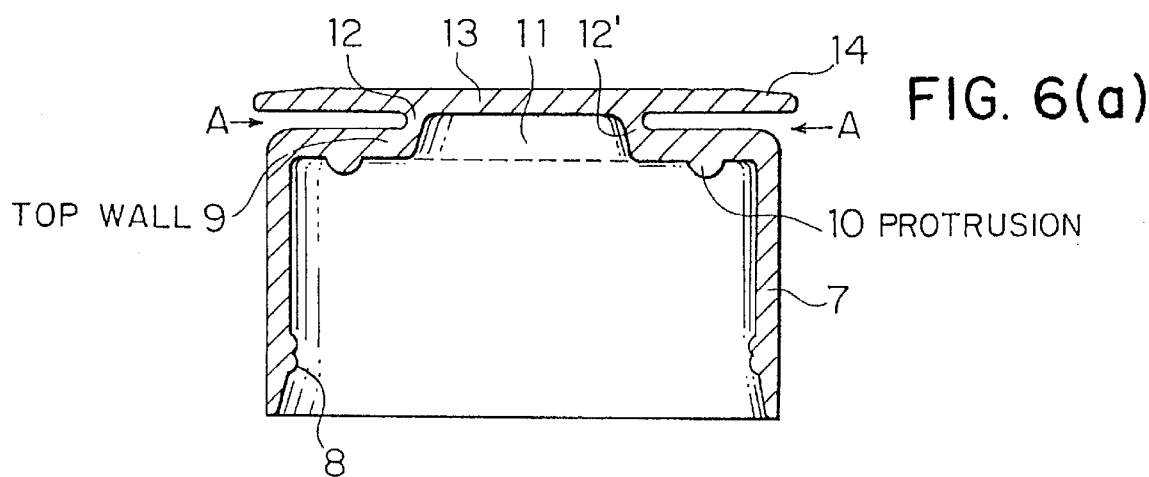

FIG. 5 is a sectional view of a container system comprising a container holding a medicament, a rubber stopper and a plastic cap covering the container, as one embodiment of the present invention, FIG. 6(a) is a sectional view of the cap of FIG. 5 and FIG. 6(b) is a sectional view along line A–A' in FIG. 6(a).

Referring to FIG. 5, a container 3 of a glass or plastic is charged with a medicament 2, an opening mouth 4 of the container 3 is sealed by a rubber stopper 5 (or sealing body like a rubber plate) and covered by a cap 1, in such a manner that an annular protrusion 6 on an outer periphery of the opening mouth 4 and two-peak protrusions provided on an inner wall of a drum part 7 of the cap 1 are engaged to strongly hold the container 3, rubber stopper 5 and cap 1. Further, a protrusion 10 can be provided on the inner wall of a top wall 9 of the cap 1, in contact with the top surface of the rubber stopper 5, whereby the rubber stopper 5 is pressed to increase elasticity of the rubber stopper 5 and improve the sealing property with the container 3.

The top wall 9 of the drum part 7 is provided with a wide hole part, i.e. window part 11 at a part corresponding to the opening mouth 4 of the container 3. In order to cover and protect the window part 11 by a top plate 13, a wide flange 14 having a larger outer diameter than that of the drum part 7 is provided around the outer periphery of the top plate 13. The top plate 13 and drum part 7 are bonded by only bridged parts 12 and 12'. In an example shown in FIG. 5, there are two bridged parts 12 and 12', but more bridged parts can of course be provided.

Figure 7:
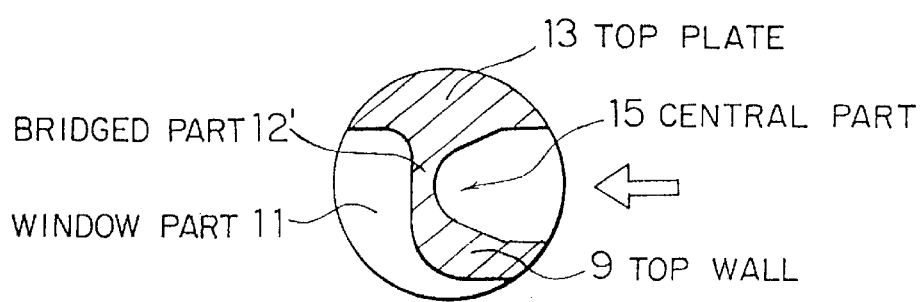
FIG. 7 is a sectional view along line A–A' of FIG. 6(a).

FIG. 7 is a partially enlarged sectional view of the vicinity of the bridged part 12'. The bridged part 12' is in the form of bonding the top wall 9 for fixing the rubber stopper and the top plate 13 as a protection cover covering the hole of the window part 11, the bridged part 12' having a central part 15 so thinned that the top plate 13 can be stripped by a weak force, as shown in FIG. 7.

Figure 8:
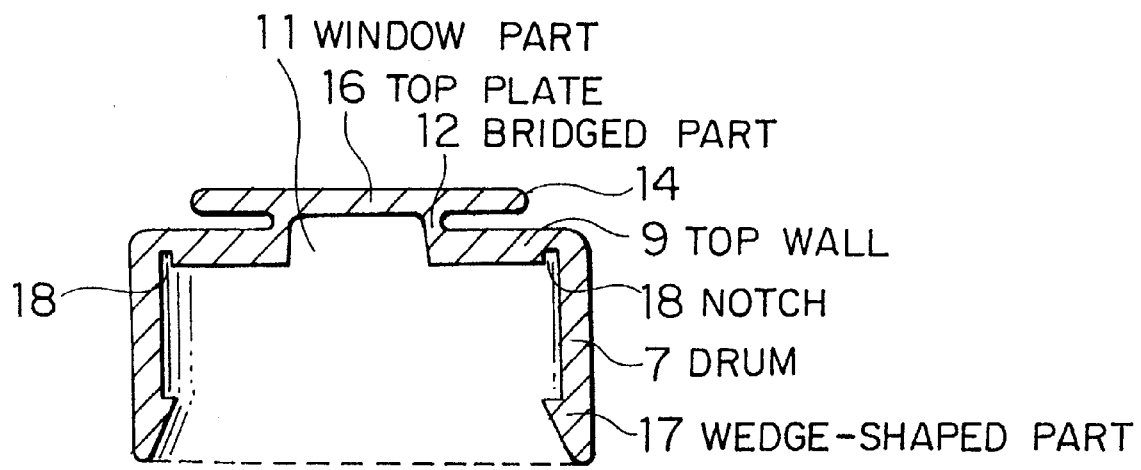
FIG. 8 is a sectional view of a further embodiment of the cap of the present invention.

FIG. 8 is a sectional view of another embodiment of the cap of the present invention. The cap drum part 7 is provided with a wedge-shaped part 17 on the inner wall surface of the lower end part, the wedge-shaped part 17 being engaged with the thick lower end of a peripheral skirt of the container mouth to fix the rubber stopper to the container mouth. In the cap of this embodiment, a notch 18 is provided in the container mouth direction at boundary of the drum part 7 and top wall 9 so that when a raw material of medicament is charged in a container and subjected to sealing of the container mouth by a rubber stopper in a step of formulation in a drying chamber, adapting of the cap 1 and rubber stopper can readily be carried out since the part of the notch 18 is so thinned that the resin tends to be elongated.

In this embodiment, the outer diameter of the flange 14 of the top plate 16 is smaller than that of the drum part 7, in section, and the peripheral edge of the flange 14 is present inside the priphery of the drum part 7. When the flange is smaller as in this embodiment, it is preferable that the central part 15 of the bridged part 12 is rendered so thin that tearing-off of the top plate 16 is easy.

Figure 9:
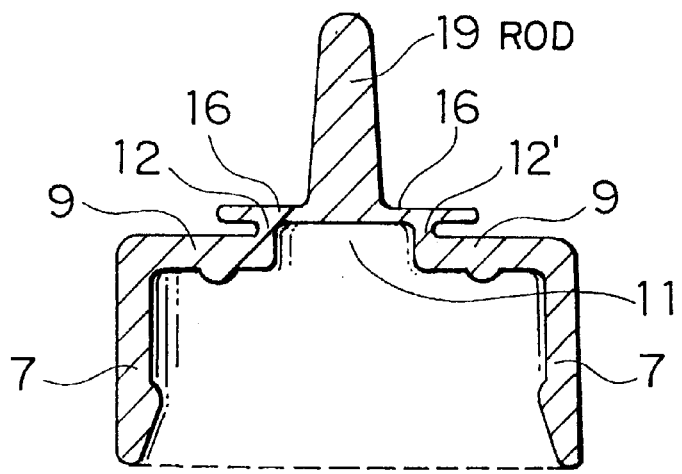
FIG. 9 is a sectional view of a still further embodiment of the cap of the present invention.

FIG. 9 is a sectional view of a further embodiment of the cap of the present invention. A round rod 19 projected upward is provided on the central part of the top plate 16 for covering the window part 11, and the top plate 16 is cut at the bridged part 12 with pushing down the round rod 19 by fingers to expose the top surface of the rubber stopper.

Figure 10A:
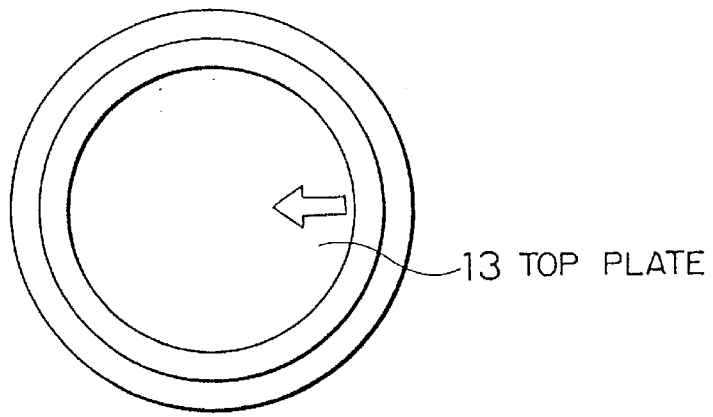
FIGS. 10(a) and (b) are plan views from above the top part of the cap of the present invention.
Figure 10B:
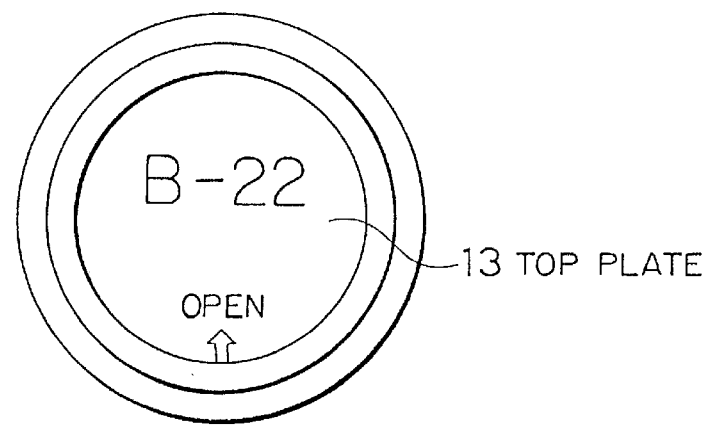

FIG. 10 is a plan view of a container system which is charged with a medicament, rubber stopper and cap. In FIG. 10(*a*), an arrow mark shows a direction of cutting the top plate 13 and flange 14 of the cap from the top wall 9 at the bridged part 12 and in FIG. 10(*b*), a medicament name or mark (like B-22) is indicated on a part corresponding to an aperture to be cut of the plastic cap.

The cap of the present invention has the advanatges that it is capable of air-tightly fixing a rubber stopper, rubber plate, etc. and container during storage of a medicament to obtain improved sealing and storage property and a top plate part can easily and surely be stripped by a smaller force during use or administration of a medicament, and moreover, the cap is very preferable for formulation of a medicament in a container. That is, the cap of the present invention has such a shape that a sterilized liquid raw material for a medicament can be charged in a container, concentrated, evaporated and completely dried in a vacuum vessel, in particular, freeze-drying vessel and a rubber stopper and cap can simultaneously be adapted under sterilized and evacuated state in the vessel.

EXAMPLES 1 TO 4, COMPARATIVE EXAMPLES 1 TO 3 AND PRIOR ART EXAMPLE

Moisture Permeability Test

Using hard plastics shown in Table 1 as a material according to the present invention, a plastic cap having the shape of FIG. 1 was prepared and a sealed container system for an injection medicament with a volume of 10 ml, comprising this plastic cap, a plastic vial and incineratable rubber stopper was then prepared (Examples 1 to 4). For comparison, a cap with a similar shape was prepared using an ordinary plastic material and subjected to a comparative test with the same container and rubber stopper (Comparative Examples 1 to 3). In addition, the procedure of Examples 1 to 4 was repeated except using an aluminum cap of the prior art [Comparative Example 4 (Prior Art Example)]. In these Examples, a moisture permeability test was carried out as described below:

Each of the containers (plastic vial with a volume of 10 ml) of Examples 1 to 4, Comparative Examples 1 to 3 and Prior Art Examples was charged with 2 g of previously dried calcium chloride, stoppered with the rubber stopper and sealed and fixed by each of the caps. Under accelerating conditions of a storage temperature of 40° C., moisture of 90% RH and one month (four weeks), weight increase of the container (quantity of moisture permeated) was measured and an increase ratio (%) to the initial weight was calculated from the mean value to obtain results as shown in Table 1, in which the number (n) of samples in each Example was five.

TABLE 1

| | | Weight Increase after Passage of Time [moisture permeated]: mg | | | |
|---|---|---|---|---|---|
| Example | Cap Material | 1 week | 2 weeks | 3 weeks | 4 weeks |
| Example | | | | | |
| 1 | HCO Resin *1) | 2.4 | 4.4 | 7.2 | 9.5 |
| 2 | COC Resin *2) | 2.6 | 4.7 | 7.9 | 9.6 |
| 3 | H-PP Resin *3) | 2.3 | 4.4 | 6.9 | 9.6 |
| 4 | PC Resin *7) | 2.5 | 4.6 | 7.2 | 9.7 |
| Comparative Example | | | | | |
| 1 | C-PP Resin *4) | 1.9 | 4.5 | 7.2 | 9.3 |
| 2 | LPDE Resin *5) | 2.1 | 4.6 | 7.1 | 9.9 |
| 3 | HDPE Resin *6) | 2.5 | 4.7 | 7.3 | 9.8 |
| 4 | Aluminum *8) | 2.6 | 4.2 | 7.7 | 9.6 |

Estimation of Results of Moisture Permeability Test

In the range of this test, there was found no significant difference between Examples 1 to 4 and Comparative Examples 1 to 4. In the following change of the racing torque during passage of time (Table 3), however, there was found a larger decrease in the ordinary plastic cap in Comparative Example as compared with the hard plastic cap of the present invention, thus telling that it is difficult to maintain the sealing property in the case of using the ordinary plastic cap.

EXAMPLES 5 AND 6 AND COMPARATIVE EXAMPLE 5

Weight Lightening Effect and Abandonment Readiness

A container system comprising the cap of the present invention, similar to Examples 1 and 3, a rubber stopper with the shape of FIG. 1, consisting of an incineratable rubber of Table 2, and a plastic vial of a material shown in Table 2 was prepared (Examples 5 and 6). Furthermore, a container system comprising the prior art aluminum cap provided with a plastic protection cover, similar to Comparative Example 4, ordinary non-incineratable rubber stopper and glass vial was prepared (Comparative Example 5) to measure a ratio of residue (ash occurrence ratio: weight %) during incinerating. The results are simultaneously shown in Table 2, from which it is apparent that the quantity of residual ash occurrence in Examples 5 and 6 is much smaller than in Comparative Example.

TABLE 2

| Example | Sealed Container System | | | Ash Occurrence Ratio in Incinerating Used Container (Ash Occurrence Source Component) wt % |
|---|---|---|---|---|
| | Container Material | Cap Material | Rubber Stopper Material | |
| Example | | | | |
| 5 | CZ Resin*) | HCO Resin *1) | D777-1 *9) | ca. 0.7% (Rubber Reinforcing Agent) |
| 6 | CZ Resin*) | H-PP Resin *3) | V10-F8 | |
| Comparative Example | | | | |
| 5 | Glass Vial | Aluminum Cap with Plastic Cover *8) | D777-3 *10) V10-F8 | ca. 88% (Glass, Aluminum, Rubber Reinforcing Agent) |

*9), *10) and * in Table 2 and the following Tables have the following meanings:
Note *9)
Rubber Stopper Material D777-1: laminated butyl rubber stopper, density 0.96, ash 0.8%, manufactured by Daikyo Seiko Co., Ltd.
Note *10)
Rubber Stopper Material D777-3: laminated butyl rubber stopper, density 0.93, ash 4.5%, manufactured by Daikyo Seiko Co., Ltd.
Note *)
Vial of CZ Resin (commercial name, manufactured by Daikyo Seiko Co., Ltd., cyclic olefinic polymer having substantially the same property as HCO Resin).

EXAMPLES 7 AND 8 AND COMPARATIVE EXAMPLES 6 TO 8

Racing Torque of Plastic Vial and Cap under Accelerating Conditions

A container system comprising a cap of a material shown in Table 3, simimilar to Examples 1 or 3, a rubber stopper of Example 5 or 6 and a plastic vial was assembled (Examples 7 and 8) and subjected to investigate the relationship of the racing torque value (N·cm) and passage of time under accelerating conditions of −20° C./0% RH~+40° C./75% RH (2 weeks cycle). The comparative caps similar to Comparative Examples 2 and 3 and prior art aluminum cap were similarly tested (Comparative Examples 6 to 8).

EXAMPLES 9 AND 10 AND COMPARATIVE EXAMPLES 9 TO 11

Test of Liquid Sealing Property in Autoclave Sterilization

A liquid leakage test was carried out by charging a plastic container with a liquid medicament, sealing the container by a rubber stopper, adapting and fixing the cap similar to Example 1 or 3 thereto (Examples 9 and 10) or the cap similar to Comparative Example 1, 2 or 3 thereto (Comparative Examples 9 to 11), as shown in Table 4, and then subjecting to a high pressure steam sterilization at 115 to 121° C. for 30 to 20 minutes.

TABLE 3

| | | Change of Passage time and Racing Torque Value (N . cm) | | | | |
|---|---|---|---|---|---|---|
| Example | Cap Material | just after | 1 month | 2 months | 4 months | 6 months |
| Example | | | | | | |
| 7 | HCO Resin *1) | 0.87 | 0.84 | 0.86 | 0.82 | 0.84 |
| 8 | H-PP Resin *3) | 1.04 | 1.0 | 0.77 | 0.73 | 0.66 |
| Comparative Example | | | | | | |
| 6 | LDPE *5) | 0.43 | 0.33 | 0.23 | 0.22 | 0.14 |
| 7 | HDPE *6) | 0.52 | 0.49 | 0.39 | 0.3 | 0.28 |
| 8 | Aluminum Cap *7) | 0.89 | 0.84 | 0.83 | 0.81 | 0.82 |

Accelerating Conditions: −20° C./0% RH~+40° C./75% RH (2 weeks cycle)

There was found no influence in the results of the permeability test as shown in Table 1, but the above described results teach that LDPE (low density polyethylene) and HDPE (high density polyethylene) as soft type plastics each have a low initial value of racing torque and large lowering of the torque after passage of time. This is probably due to that the soft plastic cannot resist a force which the cap receives from the plastic vial and due to relaxation of the tensile stress of the plastic from load of the stress for a long period of time and accelerating stress.

TABLE 4

| Example | Cap Material | Liquid Leakage in Autoclave Sterilization |
|---|---|---|
| Example | | |
| 9 | HCO Resin *1) | no liquid leakage |
| 10 | H-PP Resin *3) | no liquid leakage |
| Comparative Example | | |
| 9 | C-PP Resin *4) | slight liquid leakage |

TABLE 4-continued

| Example | Cap Material | Liquid Leakage in Autoclave Sterilization |
|---|---|---|
| 10 | LDPE *5) | releasing of cap and liquid leakage |
| 11 | HDPE *6) | releasing of cap and liquid leakage |

In Comparative Examples 9 to 11, the sealing could not be maintained to result in leakage of the liquid content from the plastic container as shown in Table 4, since the high density polyethylene (HDPE) or low density polyethylene (LDPE) has a lower thermal deformation temperature (load deflection temperature according to JISK 7207: at most 80° C. at a load of 18.6 kg) than 130° C. corresponding to a preferred temperature range in the case of the above described autoclave sterilization. In Examples 9 and 10 according to the present invention, on the other hand, complete sealing property was maintained even in the sense of the high pressure steam sterilization.

EXAMPLES 11 AND 12 AND COMPARATIVE EXAMPLES 12 AND 13

Releasing Force of Protection Cover

A releasing force of the protection cover of the plastic cap with the shape (20 mm in diameter) shown in FIG. 1 according to the present invention was compared with that of a commercially available aluminum cap provided with a plastic cover according to the prior art. As is apparent from resuts of Table 5, the releasing force of Example of the present invention is ½ times as small as that of Comparative Example. "IN" in Table 5 means Newton.

TABLE 5

| Example | Cap Material | Releasing Force of Protection Cover N/piece |
|---|---|---|
| Example | | |
| 11 | CZ Resin *11) | 25 |
| 12 | H-PP Resin *3) | 20 |
| Comparative Example | | |
| 12 | Commercially Available Aluminum Cap (in Japan) | 63 |
| 13 | Commercially Available Aluminum Cap (in Foreign) | 40 |

It is apparent from Table 5 that in the article of the present invention, the protection cover can be torn off by a much smaller force as compared with the prior art article, since in the former, the protection cover is molded with the cap into one body at small areas and the outer periphery of the cover has an edge part for push-off.

EXAMPLE 13

As a cap material of the present invention, there were used, in order to assure stable quality for a long time, i.e. 3 to 5 years concerning a medicament in a container, thermoplastic synthetic resins and thermoplastic synthetic resin compositions having high thermal deformation temperatures in a load deflection test according to JISK 7207, ASTM D 648 in which a deformation temperature at a load of 18.5 kgf was recorded. Synthetic resins suitable for this test are shown in Table 6.

When using caps made of resins having load deflection temperatures of at most 120° C. in this test, for example, polyvinyl chloride (load deflection temperature 61–80° C.), polyethylene (40–80° C. ) and polystyrene (74–90° C.), the sealing property was fluctuated by change of the embironment, transportation, etc. and the quality of a medicament could hardly be maintained for a long time.

TABLE 6

| Synthetic Resin | Load Deflection Temperature (° C.) | Tensile Strength (kg/cm²) | Name of Maker |
|---|---|---|---|
| PC | 125–142 | 560–670 | Mitsubishi Kasei, Teijin Kasei, Nippon GE Plastic |
| PAI | 260–278 | 1200–1890 | Mitsubishi Kasei |
| PAEK | 170 | | VICTREX, Mitsubishi Kasei |
| POM | 124 | 660 | Asahi Kasei, Mitsubishi Gas Kagaku |
| PAR | 175 | 670–720 | Yunichika |
| PES | 200–219 | 1220–1270 | Amco Chemicals Japan, ICI Japan |
| PEEK | 140–160 | 720–2500 | Mitsui Toatsu, Sumitomo Kagaku, ICI Japan |
| PEI | 200 | 1200–1890 | Nippon GE Plastic |
| PEK | 160–186 | 700–750 | |
| LCP | 120–190 | 1000–1700 | Mitsubishi Kasei, Nippon Sekiyu, Sumitomo Kagaku |
| Modified PPE | 128 | 660 | Asahi Kasei, Mitsubishi Gas Kagaku, Engineering Plastic |
| CPA | 124 | 600–1000 | Mitsubishi Gas Kagaku |
| COC | 123–125 | 450–700 | Mitsui Kagaku, Nippon Zeon |
| PPS | 106–135 | 1370–1550 | Toray, Toso, Hodogaya Kagaku, Kureha Kagaku |
| PSF | 174–175 | 720 | Amco Chemicals Japan |

(Note)
PC: Polycarbonate; PAI: Polyamide imide; PAEK: Polyarylether ketone POM: Polyacetal; PAR: Polyarylate; PES: Polyether sulfone PEEK: Polyether ether ketone; PEI: Polyether imide; PEK: Polyether ketone LCP: Liquid Crystal Polymer; Modified PPE: Modified Polyphenylenether CPA: Aromatic Polyamide; COC: Cyclic Olefin Resin PPS: Polyphenylene Sulfide; PSF: Polysulfone The thermoplastic resins shown in Table 6 can be used without any additives. On the other hand, even thermoplastic resins having lower load deflection temperature can be used after improving the load deflection temperature by adding thereto reinforcing agents such as glass fibers, silica, talc, clay, synthetic resin fibers, surface-treated reinforcing agents with silane-type or titanium-type coupling agents. Examples of these thermoplastic resin compositions are shown in Table 7.

Figure 14:
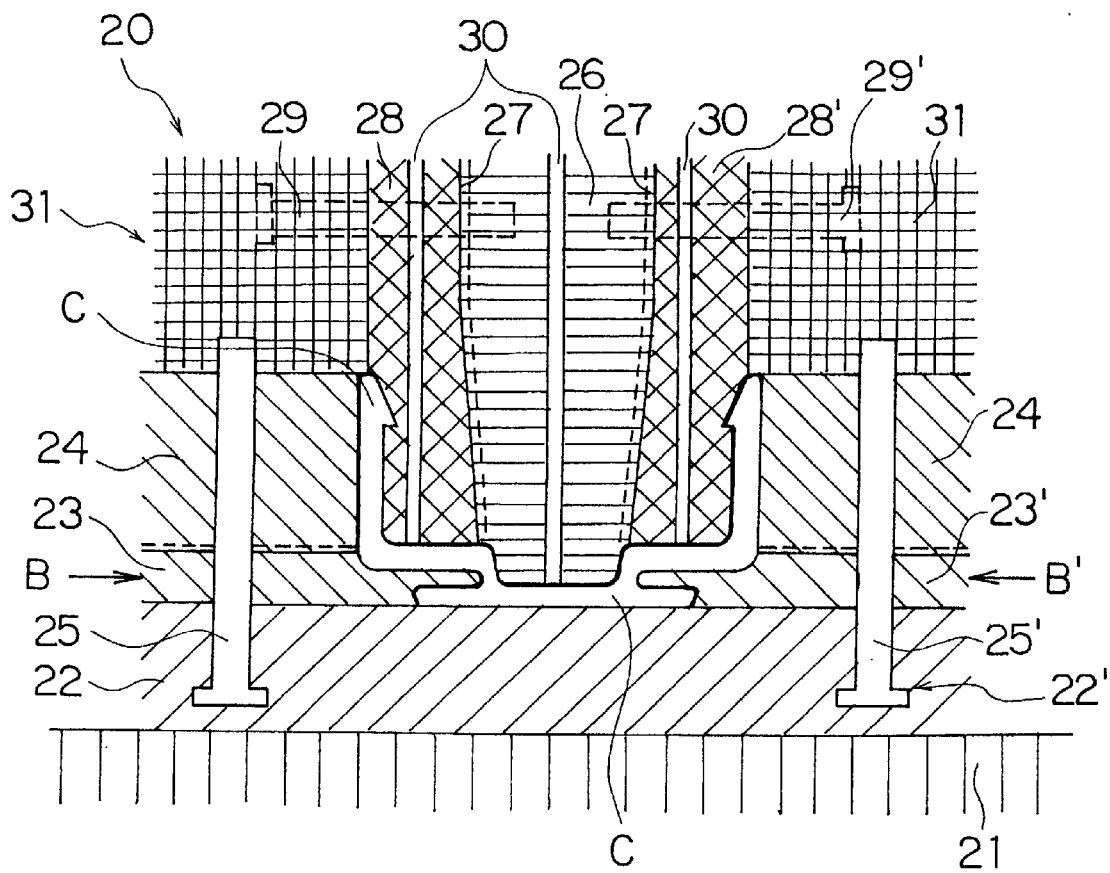
FIG. 14 is a sectional view of illustrating a production process of a cap of the present invention.
Figure 15:
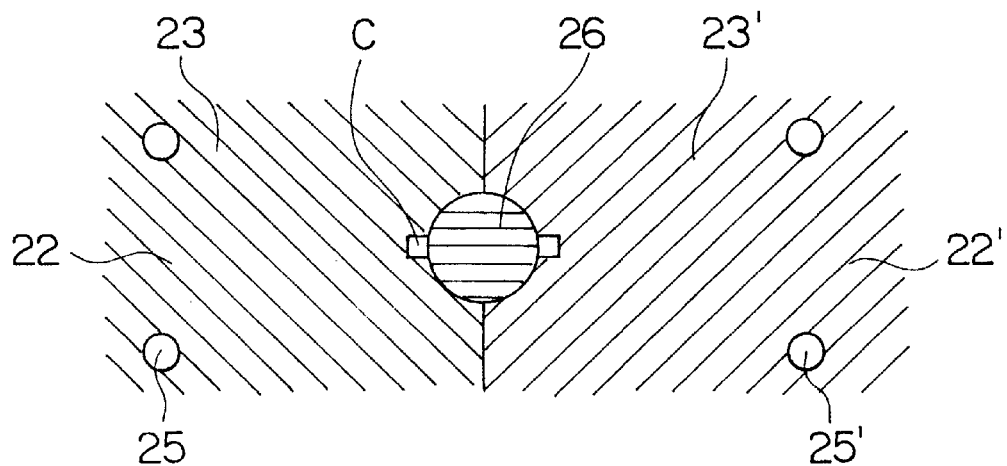
FIG. 15 is a sectional view of a split plate of FIG. 14.

FIG. 14 is a vertically sectional view showing the outline of a process for the production of a cap according to the present invention and FIG. 15 is a cross-sectional view along line B–B' in FIG. 14.

Fixed plate bases 22 and 22' are arranged on a fixed body 21 in a production apparatus, on which two split plate cores 23 and 23' are placed and cylindrical metallic mold 24 for molding a cap drum is further placed, these members being

TABLE 7

| Synthetic Resin | Added Reinforcing Agent | Amount Added (wt %) | Thermal Deformation Temperature (° C.) | Tensile Strength (kg/cm$^2$) | Name of Maker |
| --- | --- | --- | --- | --- | --- |
| PA | no |  | 49–85 | 620–840 | Asahi Kasei, Toray |
|  | glass fibers | 15–30 | 210–255 | 1100–1900 | Mitsubishi Kasei, Mitsui Toatsu, Ube kosan |
| PET | no |  | 30–85*) | 490–800 | Teijin, Toyo Bosek; |
|  | glass fibers | 15–30 | 125–230 | 420–1700 | Mitsubishi Kasei, Kurare |
| PBT | no |  | 50–85 | 530–930 | Teijin, Toyo Bosek; |
|  | glass fibers | 15–30 | 120–22 | 1200–1400 | Asahi Kasei, Mitsubishi Kasei, Kurare |
| PP | no |  | 46–85 | 260–420 | Mitsui Toatsu, |
|  | glass fibers | 20–40 | 120–156 | 310–1050 | Sumitomo Kagaku, |
|  | talc | 20–40 | 82–132 | 310–550 | Tisso Sekika, Tokuyama Soda, Idemitsu Sekika, Mitsubishi Kasei, Ube Kosan, Tonen Kagaku |
| TPX | no |  | 71–100 | 150–175 |  |
|  | glass fibers | 10–30 | 170–190 | 450–600 | Mitsui Sekiyu Kagaku |

(Note)
*) 30° C. ~ 85° C. (non-crystalline ~ crystalline)
PA: Polyamide; PET: Polyethylene Terephthalate; PBT: Polybutylene Terephthalate; PP: Polypropylene; TPX: Polymethylpentene As the thermoplastic resin of the present invention, there were used those having improved thermal deformation temperature by irradiating γ ray or using organo peroxides, or having improved load deflection temperature by subjecting various monomers (methacryloyl group- or carboxyl group-containing monomers, etc.) to graft polymerization to raw material resins.

In the present invention, in order to readily cut and tear off the top plate of the cap of the present invention at the bridged parts, the size and material of the bridged part were controlled so that the separation and tearing-off force in the tearing-off test according to JIS 6301 be 1 to 20 kgf, preferbly 1.5 to 15 kgf, more preferably 2 to 10 kgf. It was effective for cutting the bridged part by such a weak force to control a pulling force by selecting the size of the bridged part, kind of synthetic resins and kind of compounding agents. As a result of studies and tests of the inventors, it was found preferable to adjust the sectional area of the central part 15 of the bridged parts 12, 12' to 0.3 to 3 mm$^2$, preferably 0.6 to 2 mm$^2$, and the number of the bridged parts 12, 12' to two or three, and to provide a space between the top plate and the top wall of the drum part.

In this Example, a cap of the present invention was prepared as shown in the following:

fixed to a predetermined position of a stripper plate 31 by a pair of combining pins 25 and 25'.

A center movable core 26 for composing a top wall corresponding to a window of a cap is freely adapted and thrusted into four dovetail grooves 27 provided in split segments 28 and 28' for composing the inner part of the drum and combined, followed by fixing, at a predetermined position by combining pins 29 and 29' based on the stripper plate 31. The combining and thrusting of the split segments 28 and 28' and center movable core 26 by an oil pressure piston is a preferable method for improving the operation efficiency of combining metallic mold for a cap.

In a cavity C formed after closing the metallic mold is introduced the foregoing thermoplastic resin or resin composition, thermally melted, by a nozzle not shown. The melted resin is introduced under pressure from two or three runners 30 provided in the split segments 28 and 28'of the cap metallic mold using a spur bush of hot runner. The structure of the metallic mold is complicated, but injection molding is possible in ine stage. Thus, the production cost and production time can be decreased. Molding conditions in example of the cap of the present invention are shown in Table 8:

TABLE 8

| Example | Synthetic Resin (abbr.) | Previous Drying Temp. (° C.) × Time (hr) | Resin Temp. (° C.) | Metallic Mold Temp. (° C.) |
|---|---|---|---|---|
| 1 | PPS | 120 × 3 | 300 ~ 350 | 130 ~ 150 |
| 2 | PSF | 145 × 2 | 330 ~ 360 | 120 ~ 140 |
| 3 | PES | 120 × 3 | 320 ~ 360 | 140 ~ 160 |
| 4 | PEEK | 140 × 2 | 360 ~ 430 | at least 160 |
| 5 | PAR | 120 × 4 | 320 ~ 340 | 120 ~ 130 |
| 6 | PEI | 140 × 2 | 340 ~ 425 | 90 ~ 130 |
| 7 | PAI | 120 × 2 | 320 ~ 350 | 200 ~ 220 |
| 8 | LCP | 120 × 3 | 290 ~ 430 | 70 ~ 280 |

ADVANTAGES OF THE INVENTION

Since the material of a cap is specified to hard plastics in the present invention, there are obtained advantages that not only high pressure steam sterilization of a medicament (e.g. liquid injection medicament) content after preparation and sealing is rendered possible while maintaining the sealing property, but also an application range of a packaging system is markedly enlarged. The hard plastic cap of the present invention, having an edge part for push-off at the outer periphery, can readily be adapted or torn off. Accordingly, the plastic cap of the present invention has a function of preventing a container mouth part from breakage or contamination in steps of preparation and circulation of a medicament and is excellent in handling safety and convenience during use of a medicament in a medical treatment scene.

Furthermore, a cap having an edge part for push-off at the periphery thereof cannot be one body molded by the prior art method, but one body molding of such a cap is rendered possible by the three stage method according to the present invention, resulting in improvement of the production efficiency.

In addition, a container system comprising the hard plastic cap of the present invention, a rubber stopper excellent in compressibility and incineratable and a incineratable plastic container is desirable for handling workers of the system and the environment, since it does not need separation of the container after use and an incineration residue of its waste is extremely decreased.

The benefits or advantages of the present invention are summarized below:

(1) The plastic cap of the present invention has such a shape that a container can be sealed in one step by applying the cap together with a rubber stopper in a vacuum tank or vacuum chamber in a step of preparation of a medicament, in particular, in a step of preparation through freeze-drying.

(2) The cap of the present invention is capable of maintaining its sealing property for a long period of time, for example, 3 to 5 years, since the material is suitably selected with the above described shape (1).

(3) The structure of the cap of the present invention has the feature that tearing-off of the top plate is very easy during use of a medicament and incorrect use of an injection medicament can be prevented. Accordingly, the cap of the present invention is excellent in handling safety and convenience during use of a medicament in a medical treatment scene.

(4) The process for the production of a cap according to the present invention is advantageous since a cap with a complicated structure can be molded in one stage, resulting in higher economy as well as higher production efficiency, and the production cost of the cap can be decreased.

What is claimed is:

1. A process for the production of a plastic cap for covering a mouth part of a medicament container and for air-tightly fixing a sealing material to the mouth part of the container, said plastic cap comprising a drum part for covering the mouth part of the container and the sealing material and a top plate positioned on a top wall of the drum part, wherein the drum part has, on an inner wall thereof, a protrusion part to be engaged with an annular protrusion on an outer periphery of the mouth part of the container and a window part open at a center part of the top wall, an outer edge of the window part and the lower part of the top plate being connected through several bridged parts, the top plate having an area larger than the window part and covering the window part and at least a portion of the top wall, wherein the bridged parts are breakable by adding a force in a predetermined direction to the top plate to separate the top plate from the drum part, said process comprising: arranging split plate cores for forming respectively a top plate and a cap top on two fixed plate bases on a fixed body; placing a cylindrical mold for molding the cap drum on the split plate cores; placing a stripper plate on an upper part of the cylindrical mold; fixing the split plate cores and the cylindrical mold to a lower surface of the stripper plate with combining pins fitted to the fixed plate bases, then arranging two split segments having inner walls with dovetail grooves in a cavity formed by the cylindrical mold and the split plate cores; thrusting a center movable core whose lower surface part corresponds to a shape of the window part into the split segments by freely adapting to the dovetail grooves; and fixing the center movable core and the split segments to an inner side surface of the stripper plate in such a manner that the split cores, the cylindrical mold, the split segments and the center movable core form a cap cavity corresponding to a shape of the plastic cap and then introducing and injecting a resin or resin composition into the cap cavity via runners provided in the split segments to effect injection molding of the plastic cap in one stage.

* * * * *